Dec. 26, 1944.   O. STEINER   2,365,847
BETWEEN-THE-LENS SHUTTER SYNCHRONIZATION
Original Filed June 17, 1941   2 Sheets-Sheet 1
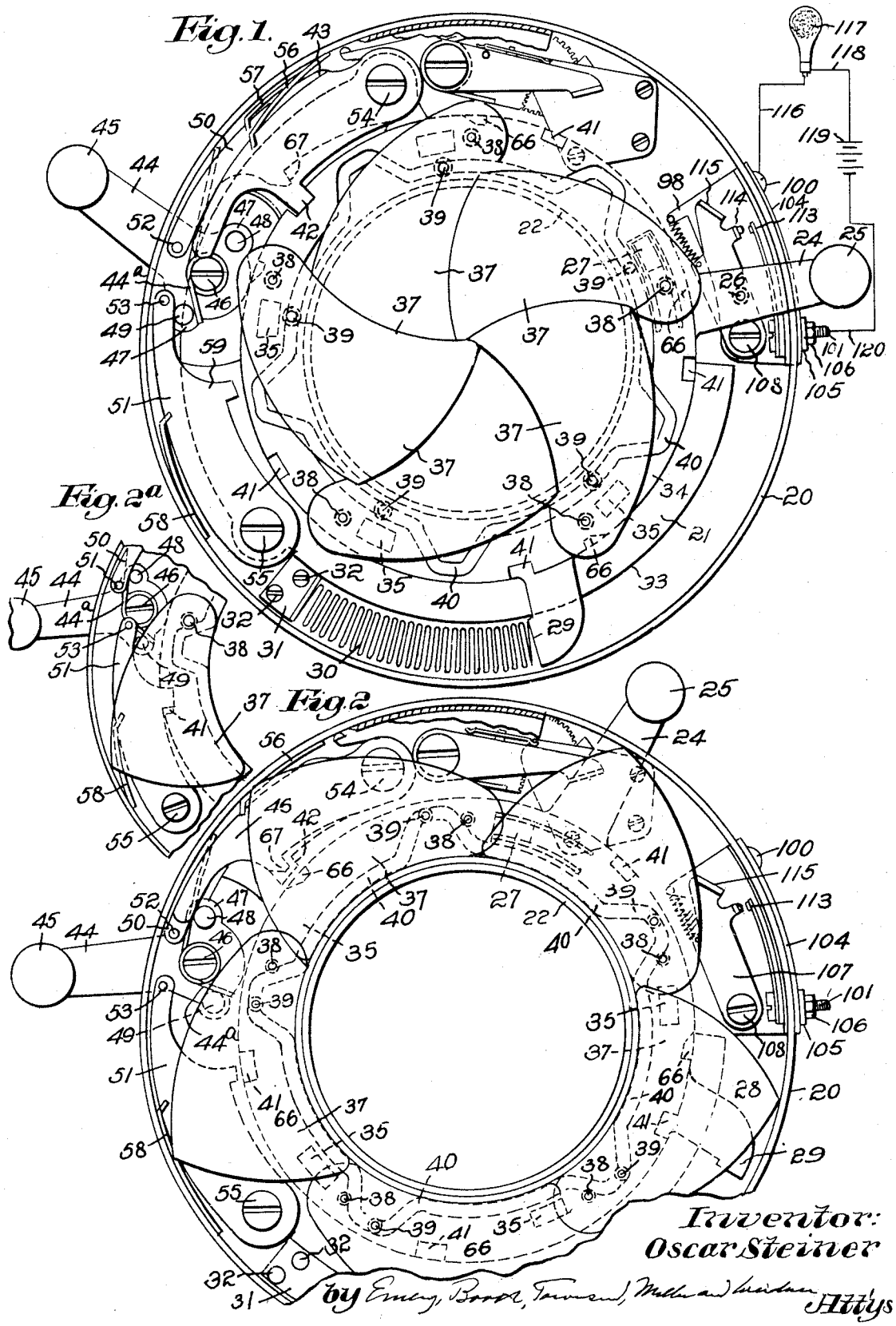
Inventor:
Oscar Steiner Dec. 26, 1944.　　　　O. STEINER　　　　2,365,847
BETWEEN-THE-LENS SHUTTER SYNCHRONIZATION
Original Filed June 17, 1941　　2 Sheets-Sheet 2
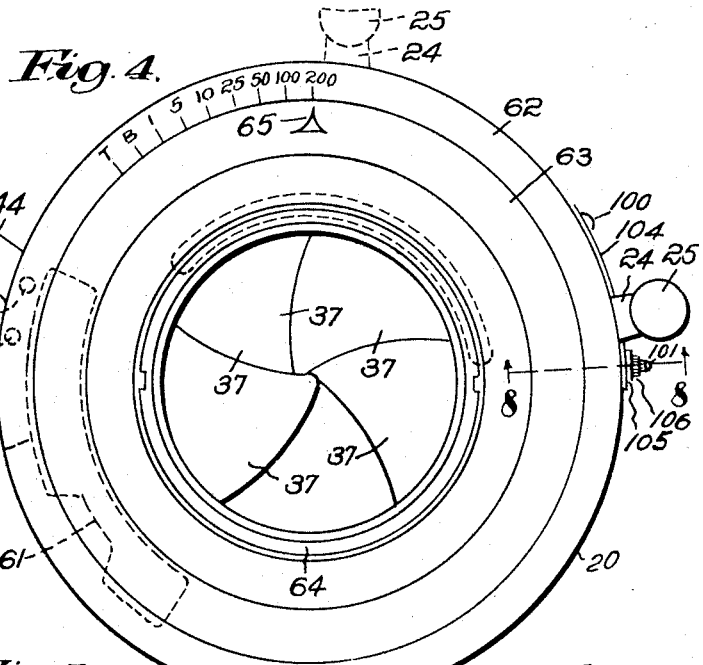
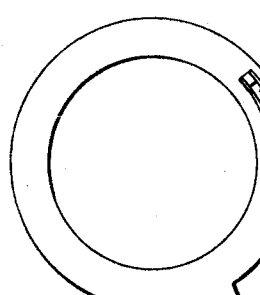
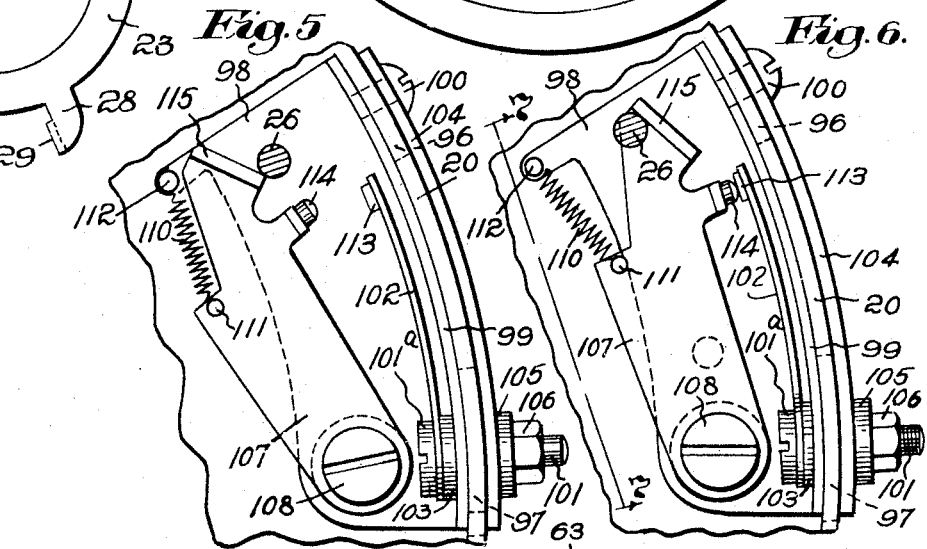
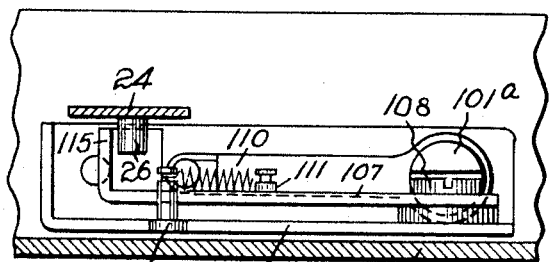
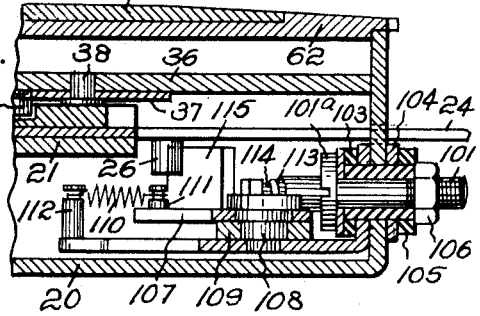
Inventor:
Oscar Steiner,
Attys.

Patented Dec. 26, 1944

2,365,847

UNITED STATES PATENT OFFICE 2,365,847

BETWEEN-THE-LENS SHUTTER SYNCHRONIZATION

Oscar Steiner, Rochester, N. Y., assignor to The Folmer Graflex Corporation, Rochester, N. Y., a corporation of Delaware Original application June 17, 1941, Serial No. 398,413. Divided and this application April 1, 1943, Serial No. 481,416

14 Claims. (Cl. 67—29)

This application is a division of my co-pending application Ser. No. 398,413, filed June 17, 1941, patented August 3, 1943, No. 2,326,077.

This invention relates to photoflash synchronization for high-speed between-the-lens shutters.

In order that the principle of the invention may be readily understood, I have disclosed a single embodiment thereof in the accompanying drawings, wherein Fig. 1 is a front elevation of the shutter and its photoflash synchronization means, the aperture setting plate and the leaf support plate being removed to show the construction of the shutter and the synchronizer operating mechanism, the shutter leaves being shown in closed condition and the shutter reset in the set or cocked position;

Fig. 2 is a similar view, but with the shutter release lever shown as depressed and the shutter leaves in the full open condition;

Fig. 2a is a partial detail of the structure in Fig. 2;

Fig. 3 is a detail in elevation of the shutter setting drive and synchronizer operating ring;

Fig. 4 is a front elevation of the shutter, showing the interrelation of the operating levers when the shutter is in the set condition, the shutter reset lever being shown in run-down condition in dotted lines;

Fig. 5 is an enlarged detail of Fig. 1, showing the position of the electrical contacting means while the shutter and the synchronizer operating ring is being reset;

Fig. 6 is a detail view similar to Fig. 5, but wherein the contacts have been closed by the shutter and synchronizer operating ring when traveling in a shutter operating direction;

Fig. 7 is a vertical section through Fig. 6, on the line 7—7 thereof; and

Fig. 8 is a vertical section through Fig. 4 on the line 8—8 thereof.

An important feature of the invention is to provide a high-speed between-the-lens shutter having built therein contacting means for effecting photoflash synchronization and wherein a combined shutter-operating and synchronizer-operating ring-like member is provided, and to provide such a shutter with photoflash synchronization mechanism that prevents inadvertent firing of the flash bulb in the act of setting the shutter.

In order to secure these and other important objects of my invention, I may employ other embodiments thereof than that herein shown, to which, therefore, my invention is not limited.

The shutter herein illustrated is desirably of the high-speed between-the-lens type disclosed in my Patent No. 2,269,400, dated January 6, 1942, and with respect to instantaneous speed and time and bulb exposures the shutter herein disclosed operates substantially the same as that disclosed in my said patent. I have, however, made certain changes and improvements in the structure in order to obtain control over the instantaneous speeds and also over the so-called slow shutter speeds, and I have incorporated novel contacting means for completing an electrical circuit through a flash bulb or other device, my invention being particularly directed thereto and to the cooperation thereof with certain features of the shutter.

Referring first particularly to Figs. 1, 2, 4 and 7, I have in Figs. 1 and 2 represented the shutter housing at 20, it desirably being of the usual structure having a projecting cylindrical portion to receive the rear element of the photographic lens (not shown), which needs no further amplification of description herein. Attached to the said shutter housing 20 is a shutter mechanism plate 21, shown in Fig. 1 and in section in part in Fig. 8. It is held in spaced relation to the bottom of the shutter housing 20 in any well known manner as by spacing studs or washers. The said mechanism plate 21 is provided with a cylindrical boss 22 (Fig. 2) protruding therefrom and into which the usual front element of the photographic lens is attached. Fitted over the said protruding boss 22 and resting on the shutter mechanism plate 21 is a combined shutter operating and synchronizer operating ring 23, shown separately and most clearly in Fig. 3. It is provided with a reset lever 24 having a reset knob 25, and with a synchronizer and slow-shutter-speed operating pin 26, a latch or pawl 27, and a radially extending arm 28 having a downturned portion 29 for engaging an operating spring 30, which, while it may be of any suitable type, is here shown of the structure most apparent in Fig. 1.

The said operating spring 30 is backed up by an angle plate 31 secured to the shutter housing 20 by means of screws 32, 32. The periphery of the said shutter mechanism plate 21 provides an edge that is turned over, as indicated at 33, to form a support for the said operating spring 30. Also fitted over the said cylindrical boss 22 and overlying the combined shutter-operating and synchronizer-operating ring 23 is a shutter leaf cam ring 34 provided with a series of spaced, circumferentially arranged openings 35, 35 engaged in turn by the pawl 27 of the combined shutter-operating and synchronizer-operating ring 23. Fitted over the said cylindrical boss 22 and spaced from the shutter mechanism plate 21 is a shutter leaf support plate 36, shown most clearly in Fig. 8, and which has attached thereto shutter leaves 37, 37, by means of shoulder rivets 38, 38, on which said shutter leaves are free to pivot. Said shutter leaves 37, 37 are also provided with short studs or dowels 39, 39 which ride in an encircling cam path 40 of the shutter leaf cam ring 34.

It will be apparent that if the shutter leaf cam ring 34 is caused to rotate in one direction, the said dowels 39, 39 will follow the said cam path 40, thus causing said shutter leaves 37, 37 to be reciprocatingly or oscillatingly opened and closed. As previously stated, the combined shutter-operating and synchronizer-operating ring 23 has integral therewith the pawl 27 which will in operation successively engage the openings 35, 35, of the shutter leaf cam ring 34 when the said combined shutter-operating and synchronizer-operating ring 23 is turned in a contraclockwise direction, and if said combined shutter-operating and synchronizer-operating ring 23 is caused to move in a contraclockwise direction a distance equal to the spacing of the openings 35, 35, the said shutter leaves 37, 37 will be caused to open fully and to close, thus effecting an exposure.

On the outer face or periphery of the shutter leaf cam ring 34 is provided a series of rectangular notches 41, 41 engaged by a release pawl 42 of a shutter operating lever 43. When the shutter is reset by the turning of shutter reset lever 24 in a clockwise direction, thus compressing the operating spring 30, the said driving dog 27 of the combined shutter-operating and synchronizer-operating ring 23 will be turned in a clockwise direction, thus engaging a new opening 35 of the shutter leaf cam ring 34. When the release pawl 42 is withdrawn from the notch 41 which it engages, the shutter leaf cam ring 34 will be driven in a contraclockwise direction under the influence of the said operating spring 30, and the driving pawl 27 of the combined shutter-operating and synchronizer-operating ring 23, until stopped by the reset lever 24 when it reaches the end of its travel in a suitable slot provided therefor in the periphery of the shutter housing 20. A new opening will now be engaged by the release pawl 42. Thus, when the shutter reset lever 24 is turned in a clockwise direction, the shutter leaf cam ring 34 will be held stationary by reason of the fact that the release pawl 42 engages a notch 41, and the pawl 27 of the combined shutter-operating and synchronizer-operating ring 23 will engage a new opening 35 when the shutter reset lever 24 reaches the end of its travel in a clockwise direction and is stopped from further travel by the end of the said slot provided therefor in the periphery of the shutter housing 20. The shutter will now be in the condition shown in Fig. 1. It will be evident from the description thus far given that I have provided simple means for obtaining an instantaneous exposure.

In Fig. 2, the shutter leaves 37 are shown in a fully opened condition, the dowels 39 having respectively ridden to the outermost positions in the cam formations 40. As the said shutter leaf cam ring 34 continues to travel in one direction, the said dowels 39 will be moved in an inward direction toward the center of the shutter, thus closing the shutter leaves 37, 37.

In order to control the shutter operating lever 43, I have provided a shutter release lever 44 having a knob 45. The said lever 44 is pivoted to the shutter mechanism plate 21 in a recess provided therefor, by means of a shoulder screw 46. At the pivoted end of the shutter release lever 44, there are provided two laterally extending bosses 47, 47 having pins 48, 49 respectively. Engaging the pin 49, wrapped about the shoulder screw 46 and engaging the shutter housing 20 is a spring 44a for the purpose of causing the said shutter release lever 44 to be turned in a clockwise direction.

In order to provide time and bulb exposures, I have provided two additional shutter operating lever arm 50 and 51 respectively, the former being provided with a pin 52 and the latter with a pin 53. The shutter operating lever arms 43 and 50, the latter being the time exposure operating lever arm just referred to, are attached to the shutter mechanism plate 21 by a shoulder screw 54, and the bulb exposure shutter operating lever arm 51 is attached to the said shutter mechanism plate 21 by a shoulder screw 55. The said shutter operating lever 43 is caused to turn in a contraclockwise direction under the influence of a spring 56, and the time-exposure shutter-operating lever-arm 50 is caused to turn in a contraclockwise direction by means of a spring 57. The bulb-exposure shutter-operating lever arm 51 is caused to turn in a clockwise direction by a spring 58. The shutter operating lever 43 and its associated release pawl 42 are provided for instantaneous exposure, whereas to secure a bulb exposure the said second lever arm 51 is employed, as will be described.

When the shutter release lever 44 is turned in a contraclockwise direction, the release pawl 42 will be disengaged from its notch 41 under the influence of the pin 48 co-acting with the shutter operating lever 43. At the same time, the bulb-exposure shutter-operating lever arm 51 having a pawl 59, will be allowed to turn in a clockwise direction under the influence of spring 58, inasmuch as the pin 49 will be removed from engagement with the said bulb-exposure shutter-operating lever arm 51. As the release pawl 42 is withdrawn from the notch 41, the shutter leaf-cam ring 34 will start turning in a contraclockwise direction, but when the notch 41 reaches the pawl 59 and is engaged thereby, the said shutter leaf cam ring 34 will be stopped from further movement. The shutter leaves 37 will then be in the fully opened condition shown in Fig. 2, the engagement of pawl 59 with notch 41 being shown in the partial detail Fig. 2a.

When the shutter release lever 44 is released, its spring 44a will cause said release lever 44 to turn in a clockwise direction, carrying with it the pin 49, which will engage the bulb-exposure shutter-operating lever arm 51, thus withdrawing the pawl 59 from the notch 41 and allowing the shutter leaf cam ring 34 to continue turning in a contraclockwise direction until the limit of motion is reached, at which time the shutter leaves 37 will again be in closed condition, and the release pawl 42 will engage a new notch 41.

During this operation the time-exposure shutter-operating lever arm 50 was held out of action by means of a cam plate 60 having a notch 61 that is most clearly shown in dotted lines in Fig. 4. The said cam plate 60 is attached to a shutter setting ring 62 which is fitted to the shutter housing 20, and is held in place by means of an index ring 63 and a locking nut 64 threaded to the centrally extending cylindrical boss 22.

When making bulb exposures, "B" on the index ring 62 is aligned with the index 65, and the notch 61 of the cam plate 60 will be moved into position to hold the time exposure operating lever arm 50 in inoperative condition, but allowing the bulb-exposure operating-lever arm 51 to operate.

In order to provide a time exposure, a second series of notches 66, 66 is provided in the shutter leaf cam ring 34, said notches being narrower in width than notches 41, 41, so that the former will not be engaged by release pawl 42 or pawl 59, but will be engaged by a pawl 67 (Figs. 1 and 2) of the time-exposure operating-lever arm 50. When the shutter setting ring 62 is turned so that "T" will be aligned with index 65, the notch 61 of the cam plate 60 will be in position to allow both the time-exposure operating-lever arm 50 and the bulb-exposure operating lever arm 51 to operate.

Assuming that the shutter is in the set condition shown in Fig. 1, the shutter release lever 44 is turned in a contraclockwise direction, thus withdrawing the pawls 42 and 67 from engaging with notch 41, and the shutter leaf cam ring 34 will turn in a contraclockwise direction until a notch 41 is engaged by the pawl 59 of the bulb-exposure operating-lever arm 51. When the shutter release lever 44 is allowed to turn in a clockwise direction under the influence of the said spring 44a, the pawl 59 of the bulb-exposure operating lever 51 will be withdrawn from the notch 41, and a notch 66 of the shutter leaf cam ring 34 will be engaged by the pawl 67 of the time-exposure operating-lever arm 50. The shutter leaf cam ring 34 will be held in this position which corresponds to the full open position shown in Fig. 2, until the shutter release lever 44 is again operated in a contraclockwise direction, thus withdrawing the said pawl 67 from a notch 66 and allowing the shutter leaf cam ring 34 to continue turning in a clockwise direction until the reset lever 24 reaches the limit of its travel, at which time the shutter leaves 37 will be in closed position.

Referring now to Figs. 4 to 8 and also to Figs. 1 and 2, I have provided means particularly cooperating with the shutter operating means just described for closing contacts of an electrical circuit for completing the circuit through a flash lamp or other device, and I will now describe the same and set forth the manner of its cooperation with the shutter operating means.

The shutter housing 20 is provided with two elongated slots or openings 96 and 97, shown in Fig. 6, for the purpose of mounting a contact base member 98 (Fig. 7), shown as made up of an L-shaped part having one edge, as indicated at 99 (Fig. 6), turned up and formed to fit the inner surface of the shutter housing 20. The said contact base member 98 is attached to the shutter housing 20 by a screw 100 and by a bolt 101 provided with a head 101a. The said bolt 101 passes through a contact spring 102 (best shown in Fig. 6), also through an insulating bushing 103, through the shutter housing slot 97, through a cover plate 104 (Figs. 6 and 8) and an insulating washer 105, and it is clamped in position by a nut 106. Pivoted to the said contact base member 98 is a contact rocker arm 107 by means of a shoulder screw 108, and it is separated from said contact base member 98 by a washer 109. The said rocker arm 107 is caused to move in a contraclockwise direction under the influence of a coiled spring 110, one end of which is attached to a pin 111 of the rocker arm 107, and the other end is attached to the pin 112 of the contact base member 98. The pins 111 and 112 are so positioned that when the said rocker arm 107 reaches a position wherein the centers of the said pins 111 and 112 and of the shoulder screw 108 are in alignment, no motion will be imparted to the rocker arm 107 by the said spring 110.

When the shutter is in the set position shown in Fig. 1, the contacts 113 and 114 will be in open position. As the shutter is released, the combined shutter-operating and synchronizer-operating ring 23 is set in motion and turned in a contraclockwise direction, carrying with it the reset lever 24 and the operating pin 26 thereon. The said operating pin will engage the under face of an upturned flange 115 of the said contact rocker arm 107. As the said operating pin 26 passes the said upturned flange 115, the contact rocker arm 107 will be caused to turn in a clockwise direction, carrying with it the contact 114 which will touch contact 113, and as the said operating pin 26 continues to travel in a contraclockwise direction, the said operating pin 26 will leave the under face of the upturned flange 115, thus allowing the contacts 113, 114 again to be restored to open condition by the spring 110, as shown in Fig. 5. As the shutter is reset by turning the reset lever 24 in a clockwise direction, the operating pin 26 will engage the outer face of the upturned flange 115, as indicated in Fig. 5.

As the shutter is reset by turning the reset lever 24 in a clockwise direction, the operating pin 26 will engage the opposite or outer surface of the upturned flange 115, as indicated in Fig. 5, causing said contact rocker arm 107 to be moved in a contraclockwise direction against the spring 110, thus allowing said operating pin 26 to be restored to the set condition shown in Fig. 1, without closing the contacts 113 and 114. Such structure is provided, in accordance with my invention, to prevent inadvertent flashing of a flash bulb if placed in the circuit prior to resetting the shutter.

The usual circuit of a flash bulb and battery is shown in Fig. 1, wherein one wire 115 is shown as grounded to the screw 100. The said wire 116 also contacts with one side of a flash bulb 117. A second wire 118 is connected to the other terminal of the said flash bulb 117 and then to a battery 119 and through a wire 120 to the screw 101 and contact member 102, through contacts 113 and 114, then through contact base member 98 to the screw 100.

The flash synchronizer mechanism herein disclosed can be readily adjusted to time the delay between contact and the actual flashing of the bulb within any requirements set up by flash bulbs as now manufactured. The shutter herein disclosed is so constructed as to have considerable delay from the time the shutter release lever 44 is operated and the time the shutter leaves 37 actually open. This is accomplished by the cam path spacing shown in Figs. 1 and 2 and hereinbefore fully described. It will be understood from the disclosure that the shutter leaf cam ring 34 travels a considerable distance before the dowels 39 are reached by the cam track variation for imparting a reciprocatory opening and closing movement to the shutter leaves 37.

The time of the contact with respect to the delay of the flash bulb is accomplished by changing the position of the synchronizer contact base member 98. This is effected by loosening the screw 100 and the nut 106 in the slots 96 and 97, respectively, of the shutter housing 20 as provided for that purpose, and then making the necessary change in the position of the contact base member 98, thus adjusting the time of actual contact with respect to the rotation of the shutter leaf cam ring 34. I have demonstrated that an adjusment from five milliseconds to thirty milliseconds between the time of actual contact and the time of the opening of the shutter leaves 37 is readily obtainable.

While I have set forth in detail the actual structure of the parts and their operation, it is desirable to call attention to the proportions of certain of the parts and the time elements involved in the operation.

The shutter herein shown is particularly adapted for making high-speed photographs. The five shutter blades 37 are operated by the shutter-leaf cam ring 34 having the cam path 40. Each shutter leaf is pivoted at 38 and has an actuating pin 39 riding in the cam path 40. The said shutter-leaf cam ring 34 is caused to be turned in a clockwise direction one fifth of a revolution (namely 72°) for each exposure. The shutter herein shown is designed to provide an exposure of $\frac{1}{200}$ of a second, and the shutter leaves 37 must be held open for five milliseconds. Therefore the five radially outermost or elevated portions of the cam path 40 will each have a length of 8°. This corresponds to five milliseconds in time, and this also corresponds to $1/200$ of a second. The shutter leaves actually start to open when each pin 39 first reaches the appropriate rise in the cam path 40. The shutter leaves continue to open until the upper end of the rise in the cam path is reached, and each leaf remains open until the end of the radially outermost, flat portion of the cam elevation is reached and begins to close as the pin 39 moves inward from the said elevated portion of the cam path. The shutter leaves are again fully closed when the concentric portion of the cam path 40 is reached by the pin 39. The speed of the shutter-leaf cam ring 34 is determined by exposure speed, and since the shutter is designed for an exposure of $\frac{1}{200}$ of a second, the radially outermost, flat, elevated portions of the cam path will be 8°, as stated, and since the shutter-leaf cam ring 34 must travel 8° in five milliseconds, the speed of the said shutter-leaf cam ring 34 is thus established.

Referring to Fig. 1, when the shutter is released, the reset lever 24 extending from the operating ring 23 will travel in a contraclockwise direction, traveling 20°, at which time the pin 26 will cause the contacts 113, 114 to be closed. The reset lever 24 continues to travel contraclockwise for 32°, at which time each pin 39 will have reached the leading edge of the radially outermost, flat portion of the cam path 40. The shutter is now fully opened, and in so opening, the ring 34 and the reset lever 24 have traveled a distance equal to 32° or twenty milliseconds, thereby providing a delay of 20 milliseconds when the shutter is adjusted as shown in Fig. 1. If the contact support plate 98 were adjusted in a contraclockwise direction, the delay in time would be greater. If the said contact support plate 98 were moved in a clockwise direction, the time delay would become shorter.

Referring to Fig. 2, the distance from the beginning of the outwardly inclined part of the cam path 40 to the position where the pin 39 is shown in the outer part of the cam path is 20°, being the same distance that is here referred to as representing 12½ milliseconds in time in Fig. 1. The distance in Fig. 2 from said position of the pin 39 to the position of the pin 26 on reset lever 24 in Fig. 2 is 32°, and the distance from said pin 26 to the position of the next pin 39 in a contraclockwise direction is 20°. Said two latter distances of 20° and 32° equal 52°, whereas the reset lever 24 in its movement actually travels through an arc of 72°. The point of location of the pin 26 in Fig. 2 indicates the point when the shutter is fully open, and an additional travel of 20° is necessary for the shutter to close. The said movement distance of 20°, as in Fig. 2, from the pin 26 to the next pin 39, is, as stated, 20°, and this corresponds to 12½ milliseconds in Fig. 1, and the cam ring 34 travels some little additional distance to close the shutter.

Having thus described one illustrative embodiment of the invention, it is to be understood that although specific terms are employed, they are used in a generic and descriptive sense and not for purposs of limitation, the scope of the invention being set forth in the following claims.

I claim:

1. A between-the-lens photographic shutter having built-in photoflash synchronization means and having a series of leaves movable reciprocatingly out and in to open and close, a cam ring movable in one direction only, and operatively connected to said leaves to impart such opening and closing movements to them by said one-direction movements, a combined cam ring operating and synchronization means operating ring substantially concentric with said cam ring and having a necessarily wide angular movement so as to move said cam ring in one direction only, and thereby reciprocatingly to move the said leaves out and in, a shutter resetting lever carried by said operating ring, a shutter release lever, an electrical circuit including a photoflash lamp and also including relatively movable contact members carried by the shutter body, means tending to separate said contact members, and means carried by said shutter body to synchronize the flash of the said lamp with the meeting of said contact members, by varying the delay in the meeting of said contact members in shutter closing movement, said means including a movable rocker lever 107 in the shutter casing and constituting one of said contact members, a pin 26 laterally projecting from said resetting lever and substantially at the end of its said wide angular movement engaging a formation on said rocker lever 107 to move it into circuit closing relation with said other contact member, the described construction providing sufficient delay to synchronize a usual or standard flashlamp, a contact base member 98 within the shutter body and whereon said rocker lever 107 is pivoted, and a spring 110 attached to said rocker lever 107 and to said base member 98.

2. A shutter and photoflash synchronizing means in accordance with claim 1, but wherein the said rocker lever 107 is provided with an upturned flange-like formation 115 with the opposite faces whereof the operating pin 26 engages in the opposite movements of said rocker lever 107, the construction and arrangement of the said parts being such that as the shutter is being reset the said operating pin 26 causes the rocker lever 107 to be moved against the stress of the spring 110, thereby allowing said operating pin 26 and the resetting lever carrying the same to be restored to the set condition without closing the said contacts.

3. A shutter and photoflash synchronizing means in accordance with claim 1, but wherein one end of the said spring 110 is attached to a pin 111 on the rocker lever 107 and the other end of said spring is attached to a pin 112 on the contact base member 98, the said pins 111 and 112 being so relatively located and arranged that when the said rocker lever 107 reaches a position wherein said pins 111 and 112 and the pivot of the lever 107 are in alignment, no motion will be imparted to the rocker lever 107 by said spring 110.

4. A between-the-lens shutter mechanism having built-in photoflash synchronization means and having a shutter body provided with a set of shutter leaves to open and close, a combined shutter-operating and synchronization-means-operating ring having a reset lever, said ring having a necessarily wide angular movement about the set of shutter leaves to open said leaves, means controlled by said combined shutter-operating and synchronization-means-operating ring to cause said shutter leaves to open and close, a shutter release lever, an electrical circuit including a photoflash lamp and also including relatively movable contact members carried by the shutter body, means to separate said contact members, and means carried by said shutter body to synchronize the flash of the said lamp with the meeting of said contact members, by varying the delay in the meeting of said contact members in shutter closing movement, said means including a movable rocker lever 107 pivoted in the shutter casing and constituting one of said contact members, a pin 26 projecting from said resetting lever and substantially at the end of its said wide angular movement engaging a formation on said rocker lever 107 to move it into circuit closing relation with said other contact member, and a spring 110 attached to said rocker lever 107 and to the shutter casing, the described construction providing sufficient delay to synchronize a usual or standard flashlamp.

5. A shutter and photoflash synchronizing means in accordance with claim 4, but wherein one end of the said spring 110 is attached to a pin 111 on the rocker lever 107 and the other end of said spring is attached to a stationary pin 112, the said pins being so relatively located and arranged that when the said rocker lever 107 reaches a position wherein said pins 111 and 112 and the pivot of the lever 107 are in alignment, no motion will be imparted to the rocker lever 107 by said spring 110.

6. Combined shutter and synchronizer-mechanism operating means for flashlamps, including a shutter body provided with a set of pivoted shutter leaves to open and close by in-and-out substantially radial movements, a circularly movable cam ring carried by said body and encircling said leaves, and having a cam path with a series of widely and equally spaced cam formations corresponding in number to said shutter leaves and receiving operating projections from said leaves; a combined cam-ring operating and synchronizer-operating ring also carried by said shutter body substantially concentrically with said cam ring and having a shutter setting lever member provided with a synchronizer-mechanism operating formation, a usual or standard flashlamp with battery and electric circuit and having contacts within said shutter body in position to be operated upon to close the circuit by engagement of the said synchronizer-mechanism operating formation on said shutter setting lever at substantially the end of a cam-ring operating turning movement of said combined operating ring, said combined operating ring having a necessarily wide angular movement to effect the opening and closing of said shutter leaves and the operation of the synchronizer-means, thereby providing sufficient delay to synchronize a usual or standard flashlamp.

7. In a synchronizer mechanism for photoflash lamps and photographic shutters, a shutter body of a between-the-lens shutter having a set of shutter leaves to open and close, a ring-like member constituting a combined shutter-operating and synchronizer-mechanism operating member, which is mounted for rotation in the shutter body of such between-the-lens shutter so as to encircle said shutter leaves, and there having a necessarily wide turning functioning movement exceeding fifty degrees to operate the synchronizer-mechanism; said ring-like member having shutter operating formations to open and close said shutter leaves and also having a synchronizer-mechanism operating formation; a usual or standard flashlamp with battery and electric circuit and having contacts in the said shutter body in position to be operated upon to close the circuit by contact engagement of the said synchronizer-mechanism operating formation at substantially the end of the said necessarily wide turning functioning movement of said ring-like member, the said mechanism thereby providing sufficient delay to synchronize a usual or standard flashlamp.

8. A structure in accordance with claim 7, but wherein there is provided in the shutter structure a lever whereon one of said contacts of the circuit is mounted, said lever having thereon a flange-like formation to be engaged by said synchronizer-mechanism operating formation on said ring-like member in its shutter-operating movement to close said contacts, one face whereof is adapted to be engaged by said synchronizer-mechanism operating formation on said ring-like member in the shutter-operating movement of said ring-like member to close said contacts at the time stated, the opposite face of said flange-like formation being engaged by said operating formation, in the resetting of the shutter and by such engagement acting to separate the contacts to prevent the flashing of a flashlamp if in position.

9. A structure in accordance with claim 6, but wherein there is provided in the shutter body a lever whereon one of the contacts of the circuit is mounted, said lever having protruding therefrom a flange-like formation that is engaged at one face by said synchronizer-mechanism operating formation in the cam-ring operating movement of said combined operating ring, the opposite face of said flange-like formation being engaged by said operating formation in the resetting of the shutter and by such engagement acting to separate the contacts to prevent the flashing of a flashlamp if in position.

10. In a flashlamp synchronizer for a between-the-lens shutter, a housing receiving said shutter and whereinto the latter is built; a contact base member 98 and means to support the same upon the inner surface of the shutter housing; a contact spring 102 carried by said base member; a lever 107 pivoted on said base member and carrying a contact point 114 for engagement with the said contact spring 102 and also having a flange-like formation 115 provided with opposite faces, a reset lever having a projecting pin 26 to engage the opposite faces of said formation 115 in the movement of the resetting lever for the purpose of moving said lever 107 so as to bring the contact 114 into engagement with the contact spring 102, and a spring 110 having one end connected to the base member 98 and its other end connected to said lever 107 at a point between the pivot of said lever 107 and the point of connection of the said spring 110 to said base member; the said points of connection of said spring being such that the pivot of said lever and the points of support of said spring 110 may be brought into line, in which condition the said spring does not impart motion to said lever 107.

11. In a flashlamp synchronizer for a between-the-lens shutter, a housing receiving said shutter and whereinto the latter is built; a contact base member 98 having an upturned flange; a screw 101 securing said flange to the rim of the shutter housing; a contact spring arm carried by said base member and held in place by said screw 101; a lever 107 pivoted on said base member and carrying a contact point 114 for engagement with the said contact spring 102 and also having a flange-like formation 115 provided with opposite faces, a reset lever having a projecting pin 26 to engage the opposite faces of said formation 115 in the movement of the resetting lever for the purpose of moving said lever 107 so as to bring the contact 114 into engagement with the contact spring .02, and a spring 110 having one end connected to the base member 98 and its other end connected to said lever 107 at a point between the pivot of said lever 107 and the point of connection of the said spring 110 to said base member.

12. In a flashlamp synchronizer for a between-the-lens shutter, a housing receiving said shutter and whereinto the latter is built; a contact base member 98 supported upon the inner surface of the shutter housing, the latter having elongated slots 96, 97 for permitting circumferential adjustment of said base member 98; screws for adjustably securing said base member along said slots; a contact spring 102 carried by said base member; a lever 107 pivoted on said base member and carrying a contact point 114 for engagement with the said spring 102 and also having a flange-like formation 115 provided with opposite faces, a reset lever having a projecting pin 26 to engage the opposite faces of said formation 115 in the movement of the resetting lever for the purpose of moving said lever 107 so as to bring the contact 114 into engagement with the contact spring 102, and a spring 110 having one end connected to the base member 98 and its other end connected to said lever 107 at a point between the pivot of said lever 107 and the point of connection of the said spring 110 to said base member.

13. In a flashlamp synchronizer for a between-the-lens shutter, a housing receiving said shutter and whereinto the latter is built; a contact base member 98; means including screw 101 and nut 105 to hold said base member 98 adjustable in place upon the inner surface of the shutter housing; a contact spring 102 held in place upon said base member by said screw 101 and nut 105; a lever 107 pivoted on said base member and carrying a contact point 114 for engagement with the said contact spring 102 and also having a flange-like formation 115 provided with opposite faces, a reset lever having a projecting pin 26 to engage the opposite faces of said formation 115 in the movement of the resetting lever for the purpose of moving said lever 107 so as to bring the contact 114 into engagement with the contact spring 102, and a spring 110 having one end connected to the base member 98 and its other end connected to said lever 107 at a point between the pivot of said lever 107 and the point of connection of the said spring 110 to said base member.

14. In a synchronizer-mechanism for photo-flash lamps and photographic shutters; a ring-like member constituting a combined shutter-operating and synchronizer-mechanism operating member, which is mounted for rotation in the body structure of a between-the-lens shutter about the shutter leaves thereof, and there to have a necessarily wide turning functioning movement exceeding fifty degrees to operate the shutter mechanism, said ring-like member having shutter operating formations to open and close said shutter leaves and having a synchronizer-mechanism operating formation; a usual or standard flashlamp with battery, and an electric circuit having contacts in the said shutter structure positioned to be operated upon to close the circuit by contact engagement therewith of the said synchronizer-mechanism operating formation; the said contacts being mounted in the said shutter body structure, a movable member carrying one of said contacts in position to be engaged by the said synchronizer-mechanism operating formation to close said contacts; the place at which said contacts are positioned within the shutter body structure being such that the said ring-like operating member must have nearly reached the limit of its necessarily wide turning movement in its shutter-operating direction of movement in order to engage and act upon said movable member carrying one of said contacts to close the circuit, whereby there is provided a sufficient delay to synchronize a usual or standard flashlamp with the opening of the shutter leaves.

OSCAR STEINER.